(12) United States Patent
Hidehiro et al.

(10) Patent No.: US 7,398,102 B2
(45) Date of Patent: Jul. 8, 2008

(54) MULTI-MODE COMMUNICATION DEVICE OPERABLE IN GSM/WCDMA

(75) Inventors: Takahashi Hidehiro, Suwon-shi (KR);
Sang-Woo Kim, Sungnam-shi (KR);
Se-Hee Han, Sungnam-shi (KR);
Jai-Shin Chung, Seoul (KR)

(73) Assignee: Samsung Electronics Co., ltd, Suwon, Kyungki-do (KR)

( * ) Notice: Subject to any disclaimer, the term of this patent is extended or adjusted under 35 U.S.C. 154(b) by 758 days.

(21) Appl. No.: 10/730,148

(22) Filed: Dec. 8, 2003

(65) Prior Publication Data
US 2004/0132488 A1 Jul. 8, 2004

(30) Foreign Application Priority Data
Jan. 7, 2003 (KR) .................. 10-2003-0000736

(51) Int. Cl.
*H04Q 7/20* (2006.01)
(52) U.S. Cl. .................. 455/552.1; 455/73; 455/91; 375/295
(58) Field of Classification Search .................. 375/219, 375/316, 340, 295; 455/102, 132, 73, 127.4, 455/552.1
See application file for complete search history.

(56) References Cited

U.S. PATENT DOCUMENTS

| 6,061,385 | A | 5/2000 | Ostman |
| 6,362,762 | B1 * | 3/2002 | Jensen et al. ................ 341/143 |
| 6,577,258 | B2 * | 6/2003 | Ruha et al. ................... 341/143 |
| 2003/0021367 | A1 * | 1/2003 | Smith .......................... 375/346 |

FOREIGN PATENT DOCUMENTS

CN 1332910 1/2002

OTHER PUBLICATIONS

Xiaowei Xhu et al, "The RF module Design for W-CDMA/GSM Dual Band and Dual Mode Handset", State Key Laboratory of Millimeter Waves, Department of Radio Engineering, 2001 IEEE.*
Abstract from International Application No. WO 00/41322 for corresponding Chinese Publication No. 1332910.

* cited by examiner

*Primary Examiner*—David C. Payne
*Assistant Examiner*—Leon Flores
(74) *Attorney, Agent, or Firm*—F. Chau & Associates, LLC

(57) ABSTRACT

There is provided a multi-mode communication system which is operable according to different operating modes, such as GSM and WCDMA. The multi-mode communication system includes first and second switching units, a delta-sigma modulator, an analog-to-digital converter, sequential convolution units and a selection unit. The delta-sigma modulator samples an analog signal, which is inputted through the first switching unit in one mode, into 1-bit digital signal. In another mode, the analog-to-digital converter samples an analog signal, which is inputted through the first switching unit into an n-bit digital signal. The sequential convolution units multiply filter factors with the output of the delta-sigma modulator, which is inputted through the second switching unit at the first mode, and multiply PN codes by the output of the analog-to-digital converter, which is inputted through the second switching unit at the second mode, to generate WCDMA output waveforms. The selection unit delays the outputs of the sequential convolution units by a predetermined time at the GSM mode to restore GSM output waveforms. Accordingly, the multi-mode communication system is operable according to multimodes, such as GSM mode and WCDMA mode.

11 Claims, 2 Drawing Sheets

MULTI-MODE COMMUNICATION DEVICE OPERABLE IN GSM/WCDMA

BACKGROUND OF THE INVENTION

1. Field of the Invention

The present invention relates to a multi-mode communication device, and more particularly, to a multi-mode communication device which is operable in either GSM/WCDMA mode.

2. Description of the Related Art

Global System for Mobile Communications (hereinafter, referred to as "GSM") is an international standard for cellular services used in certain parts of the world. For example, GSM operates in the 900 MHz band (890 MHz-960 MHz) in Europe and Asia and in the 1900 MHz (sometimes referred to as 1.9 GHz) band in the United States. With present and future demands for multimedia capabilities for mobile phone, data and video access as well as transmission of voice in communication services, the current transmission capacity of mobile networks quickly becomes insufficient.

A universal mobile telecommunication system (hereinafter, referred to as "UMTS") is a global wireless multimedia system that provides wireless communications having very fast data transmission and provides more flexible functions to users in a form of new kinds of services. Basic requirements of the UMTS network includes higher transmission rate, the number of subscriber access, and larger capacity in the current system, and also more enhanced quality of service, wider coverage area, and a large number of supplementary services in the current mobile communication network.

Wideband CDMA (WCDMA) is a third-generation (3G) mobile wireless technology offering much higher data speeds to mobile and portable wireless devices than narrowband CDMA. WCDMA can support mobile/portable voice, images, data, and video communications at up to 2 Mbps (local area access) or 384 Kpbs (wide area access). The input signals are digitized and transmitted in coded, spread-spectrum mode over a broad range of frequencies. A 5 Mhz-wide carrier is used, compared with 200 Khz-wide carrier for narrowband CDMA.

Universal Mobile Telecommunications Service (UMTS) is another 3G network that can be used to transmit digitally formatted voice, multimedia or other information. As the simplest configuration of the data transmission channel, the UMTS is a telephone or a portable computer that operates almost throughout the world and provides a constant high-speed access to Internet network. The UMTS is capable of transmitting high quality video images. The UMTS system is based on the GSM system and operates at a frequency of about 2 GHz, which is higher than a frequency of a current DCS-1800 network (a 1800 MHz digital cellular system).

GSM is mostly used in Europe and Asia, and CDMA is used mostly in America, China, Korea, India and Taiwan. In an environment in which voice and data communications are enhanced and expanded in world markets, a strong demand exists from international travelers for a "universal telephone" that is operable in many nations. For example, a phone operable in multi-mode such as in GSM and/or WCDMA.

SUMMARY OF THE INVENTION

It is to be understood that both the foregoing general description and the following detailed description of the present invention are exemplary and explanatory and are intended to provide further explanation of the invention as claimed.

According to as aspect of the present invention, a multi-mode communication device comprises: a first switch for receiving an analog signal; a delta-sigma modulator for sampling the analog signal inputted through the first switch when operating in a first mode; an analog-to-digital converter for sampling the analog signal inputted through the first switch when operating in a second mode; a second switch for selectively receiving an output of the delta-sigma modulator and an output of the analog-to-digital converter; a plurality of sequential convolution modules for multiplying filter factors by the output of the delta-sigma modulator in the first mode to generate first-mode waveforms, and multiplying PN codes by the output of the analog-to-digital converter in the second mode to generate second-mode output waveforms; and a selection unit for delaying outputs of the sequential convolution modules by a predetermined time in the first mode to restore first-mode output waveforms, wherein the first mode and the second mode are GSM mode and WCDMA mode, respectively.

Preferably, each of the sequential convolution modules includes: a memory for storing the filter factors; a third switch for selectively receiving the filter factors and the output of the analog-to-digital converter according to the first mode or the second mode; a PN code generator for generating PN codes in the second mode; a fourth switch for selectively receiving the output of the delta-sigma modulator and the PN codes according to the first mode or the second mode; a multiplier for multiplying the filter factors with the output of the delta-sigma modulator in the first mode, and for multiplying the output of the analog-to-digital convertor by the PN codes in the second mode; and an accumulator for accumulating the outputs of the multiplier to generate output waveforms, wherein the filter factors are factors of a first-mode low pass filter, and the memory is a ROM.

According to another embodiment of the invention, a multi-mode communication device is provided which is operable in a first mode and a second mode, comprising: switching means for switching received analog signal to a delta-sigma modulator in the first mode and to an analog-to-digital converter in the second mode; convolution modules for multiplying filter factors with the output of the delta-sigma modulator in the first mode to generate first-mode waveforms, and multiplying PN codes with the output of the analog-to-digital converter in the second mode to generate second-mode output waveforms; and output means for outputting the first-mode waveforms after a predetermined delay in the first mode to restore first-mode output waveforms and outputting the second-mode output waveforms without the predetermined delay in the second mode.

According to another aspect of the invention, a method is provided for operating a multi-mode communication device comprising: sampling an analog signal in a delta-sigma modulator when operating in a first mode; sampling the analog signal in an analog-to-digital converter when operating in a second mode; multiplying the output of the delta-sigma modulator with filter factors in the first mode to generate first-mode waveforms, and multiplying the output of the analog-to-digital converter with PN codes in the second mode to generate second-mode output waveforms; and outputting the product in the first mode after a predetermined time delay and the product in the second mode without the predetermined time delay.

BRIEF DESCRIPTION OF THE DRAWINGS

The accompanying drawings, which are included to provide a further understanding of the embodiments of the invention and are incorporated in and constitute a part of this application, illustrate embodiment(s) of the invention and together with the description serve to explain the principle of the invention. In the drawings.

DETAILED DESCRIPTION OF PREFERRED EMBODIMENTS

Reference will now be made in detail to preferred embodiments of the present invention, examples of which are illustrated in the accompanying drawings. The present invention is not limited to the embodiments illustrated hereinafter, and the embodiments herein are rather introduced to provide easy and complete understanding of the scope and spirit of the present invention.

A multi-mode communication system providing both GSM mode and WCDMA mode will be described below in detail. Herein, the GSM mode and the WCDMA mode are represented by a first mode and a second mode, respectively. The multi-mode communication system according to the present invention is described with reference to FIGS. 1 and 2.

Figure 1:
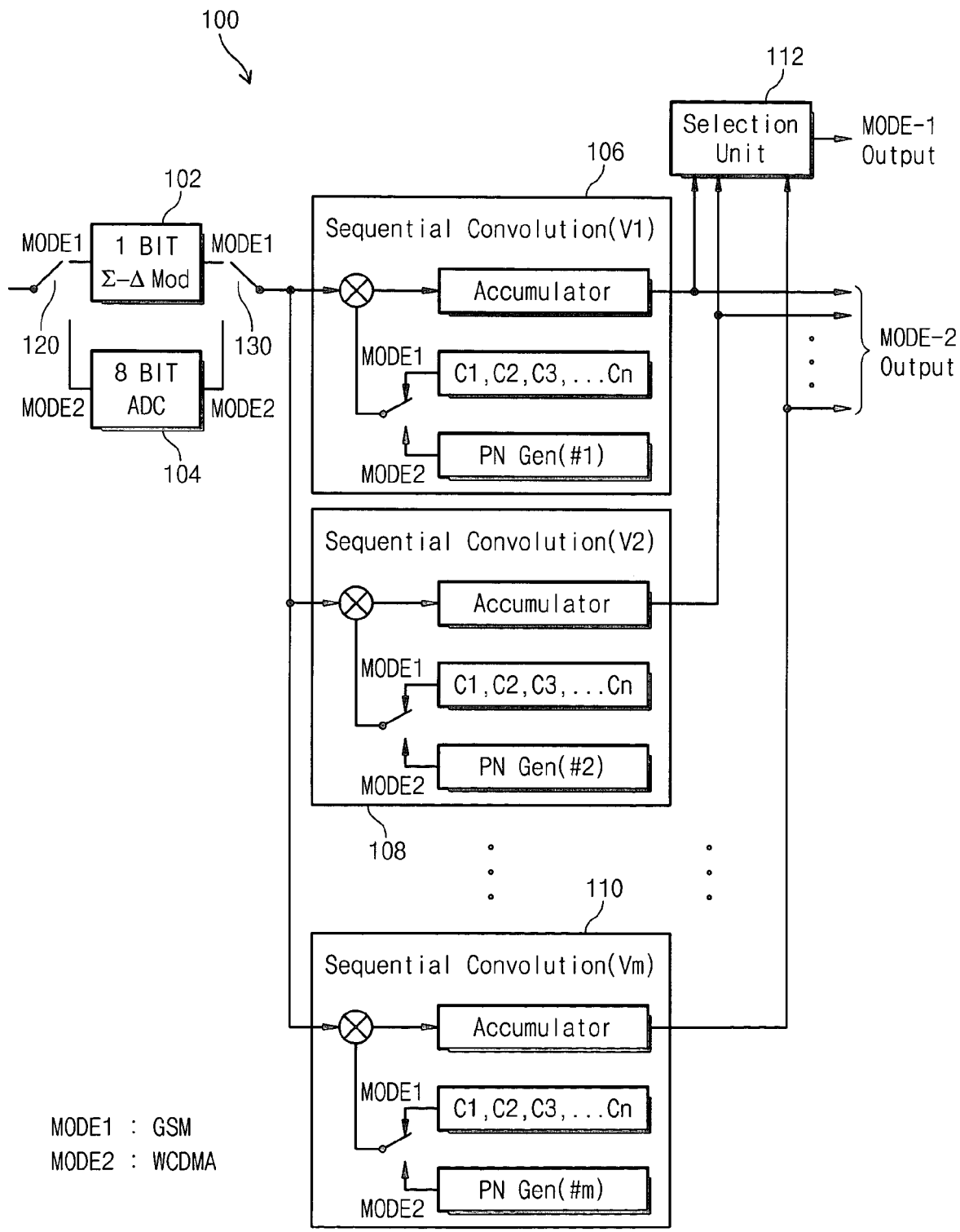
FIG. 1 is a block diagram of a multi-mode communication system according to an embodiment of the present invention.

FIG. 1 is a block diagram of a multi-mode communication system 100 according to an embodiment of the present invention, which includes a delta-sigma modulator 102, an 8-bit analog-to-digital converter (ADC) 104, sequential convolution units 106, 108 and 110, a mode selection unit 112, and first and second switching unit 120 and 130. When operating in the first mode, the delta-sigma modulator 102 converts an input analog signal into a 1-bit digital signal to generate a 1-bit symbol for each period. The 8-bit analog-to-digital converter 104 samples the analog signal and converts the sampled analog signal into an 8-bit digital signal. The first switching unit 120 selectively connects the inputted analog signal to the delta-sigma modulator 102 or the 8-bit analog-to-digital converter 104. The second switching unit 130 selectively connects an output of the delta-sigma modulator 102 or an output of the 8-bit analog-to-digital converter 104 to the sequential convolution units 106, 108 and 110.

The sequential convolution units 106, 108 and 110 receive the output of the delta-sigma modulator 102 or the output of the 8-bit analog-to-digital converter 104 through the second switching unit 130 and multiply the output by filter factors C1 to Cn or pseudo noise (PN) codes, depending on whether operation is in the first or second mode.

Figure 2:
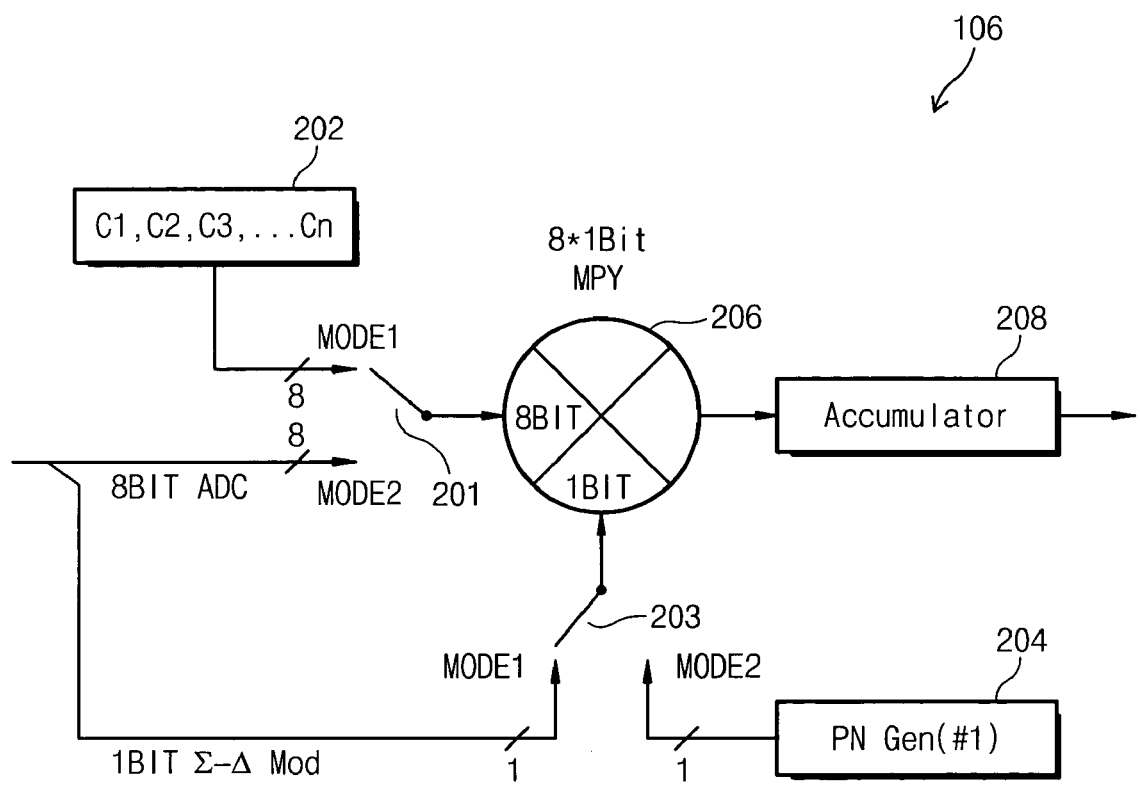
FIG. 2 is a detailed diagram of the sequential convolution unit contained in the multi-mode communication system of FIG. 1.

FIG. 2 is a detailed diagram of a sequential convolution unit 106, 108, or 110. FIG. 2 is explained with reference to the first sequential convolution unit 106 for illustrative purposes. The first sequential convolution unit 106 includes third and fourth switching units 201 and 203, a ROM 202, a PN code generator 204, a multiplier 206, and an accumulator 208. The ROM 202 stores the filter factors C1 to Cn. The third switching unit 201 selectively transfers the filter factors C1 to Cn and the output of the 8-bit analog-to-digital converter (104 in FIG. 1) to the multiplier 206 according to the first or second mode. C1 to Cn are filter factors of a GSM-mode low pass filter, and the filter factors are multiplied by the 1-bit output of the delta-sigma modulator (102 in FIG. 1) to regenerate (or restore) an output signal.

When used for WCDMA, code division multiplexed channels are identified by PN codes, and transmitted through the same frequency band. The fourth switching unit 203 selectively transfers the 1-bit output of the delta-sigma modulator (102 in FIG. 1) and the 1-bit output of the PN code generator 204 to the multiplier 206 according to the first or second mode. The 1-bit output of the PN code generator 204 and the output of the 8-bit analog-to-digital converter (104 in FIG. 1) are multiplied to restore an output waveform. The accumulator 208 accumulates operation results of the multiplier 206 to thereby generate GSM-mode or WCDMA-mode output waveforms.

Referring again to FIG. 1, the outputs of the sequential convolution units 106, 108, and 110 are connected to the selection unit 112. When operating in the second mode (e.g., WCDMA mode), the output from the sequential convolution unit 106 is the data of PN code #1 channel. The output from the sequential convolution unit 108 is the data of PN code #2 channel. These channels are code division multiplexed.

In the multi-path propagation case of WCDMA, the different path signals are identified by different timing of the PN code. The signals are restored independently by different sequential convolution units 106 and 108. The outputs of 106 and 108 are combined to form the Rake receiver. In this case the PN code #1 and #2 are the same code sequence but they are different in timing. When operating in the first mode, the selection unit 112 outputs convolution results at spaced apart time intervals (decimation) to thereby restore the GSM output waveforms. The timing, delay, and waveform characteristics of GSM and WCDMA are known to one skilled in the art and are not explained herein.

Accordingly, the multi-mode communication system of the present invention can be operable according to the GSM mode or the WCDMA mode. Hardware configuration is simplified since different communication protocols or systmes (e.g., GSM mode or WCDMA mode) are integrated in a single structure. Further, common hardware configuration such as the sequential convolution units can share the multiplier in the GSM mode and the CDMA mode. Although the present disclosure describes a multi-mode communication system that provides operation of GSM mode or the WCDMA mode, the embodiments of the present invention are not limited to those modes.

It will be apparent to those skilled in the art that various modifications and variations can be made without departing from the gist of the present invention. Thus, it is intended that the present invention covers the modifications and variations of this invention provided they come within the scope of the appended claims and their equivalents.

What is claimed is:

1. A multi-mode communication device comprising:
   a first switch for receiving an analog signal;
   a delta-sigma modulator for sampling the analog signal inputted through the first switch when operating in a first mode;
   an analog-to-digital converter for sampling the analog signal inputted through the first switch when operating in a second mode;
   a second switch for selectively receiving an output of the delta-sigma modulator and an output of the analog-to-digital converter;
   a plurality of sequential convolution modules for multiplying filter factors by the output of the delta-sigma modulator in the first mode to generate first-mode waveforms, and multiplying PN codes by the output of the analog-to-digital converter in the second mode to generate second-mode output waveforms; and
   a selection unit for delaying outputs of the sequential convolution modules by a predetermined time in the first mode to restore first-mode output waveforms.

2. The multi-mode communication device of claim 1, wherein each of the sequential convolution modules includes:
- a memory for storing the filter factors;
- a third switch for selectively receiving the filter factors and the output of the analog-to-digital converter according to the first mode or the second mode;
- a PN code generator for generating PN codes in the second mode;
- a fourth switch for selectively receiving the output of the delta-sigma modulator and the PN codes according to the first mode or the second mode;
- a multiplier for multiplying the filter factors with the output of the delta-sigma modulator in the first mode, and for multiplying the output of the analog-to-digital convertor by the PN codes in the second mode; and
- an accumulator for accumulating the outputs of the multiplier to generate output waveforms.

3. The multi-mode communication device of claim 1, wherein the first mode and the second mode are GSM mode and WCDMA mode, respectively.

4. The multi-mode communication device of claim 1, wherein the filter factors are factors of a first-mode low pass filter.

5. The multi-mode communication device of claim 2, wherein the memory is a ROM.

6. The multi-mode communication device of claim 3, wherein the output of the delta-sigma modulator is 1 bit, the output of the PN code generator is 8 bits, and the filter factors are 8 bits.

7. A multi-mode communication device operable in a first mode and a second mode, comprising:
- switching means for switching received analog signal to a delta-sigma modulator in the first mode and to an analog-to-digital converter in the second mode;
- convolution modules for multiplying filter factors with the output of the delta-sigma modulator in the first mode to generate first-mode waveforms, and multiplying PN codes with the output of the analog-to-digital converter in the second mode to generate second-mode output waveforms; and
- output means for outputting the first-mode waveforms after a predetermined delay in the first mode to restore first-mode output waveforms and outputting the second-mode output waveforms without the predetermined delay in the second mode, wherein each of the convolution modules includes:
- a memory for storing the filter factors;
- a third switch for selectively receiving the filter factors and the output of the analog-to-digital converter according to the first mode or the second mode;
- a PN code generator for generating PN codes in the second mode;
- a fourth switch for selectively receiving the output of the delta-sigma modulator and the PN codes according to the first mode or the second mode;
- a multiplier for multiplying the filter factors with the output of the delta-sigma modulator in the first mode, and for multiplying the output of the analog-to-digital convertor by the PN codes in the second mode; and
- an accumulator for accumulating the outputs of the multiplier to generate output waveforms.

8. The multi-mode communication device of claim 7, wherein the analog signal received in the first mode is GSM signal and in the second mode is WCDMA signal.

9. The multi-mode communication device of claim 7, wherein the filter factors are factors of a first-mode low pass filter.

10. The multi-mode communication device of claim 7, wherein the memory is a ROM.

11. The multi-mode communication device of claim 7, wherein the output of the delta-sigma modulator is 1 bit, the output of the PN code generator is n bits, and the filter factors are n bits, n being a multiple of 2.

* * * * *